United States Patent Office 3,663,412
Patented May 16, 1972

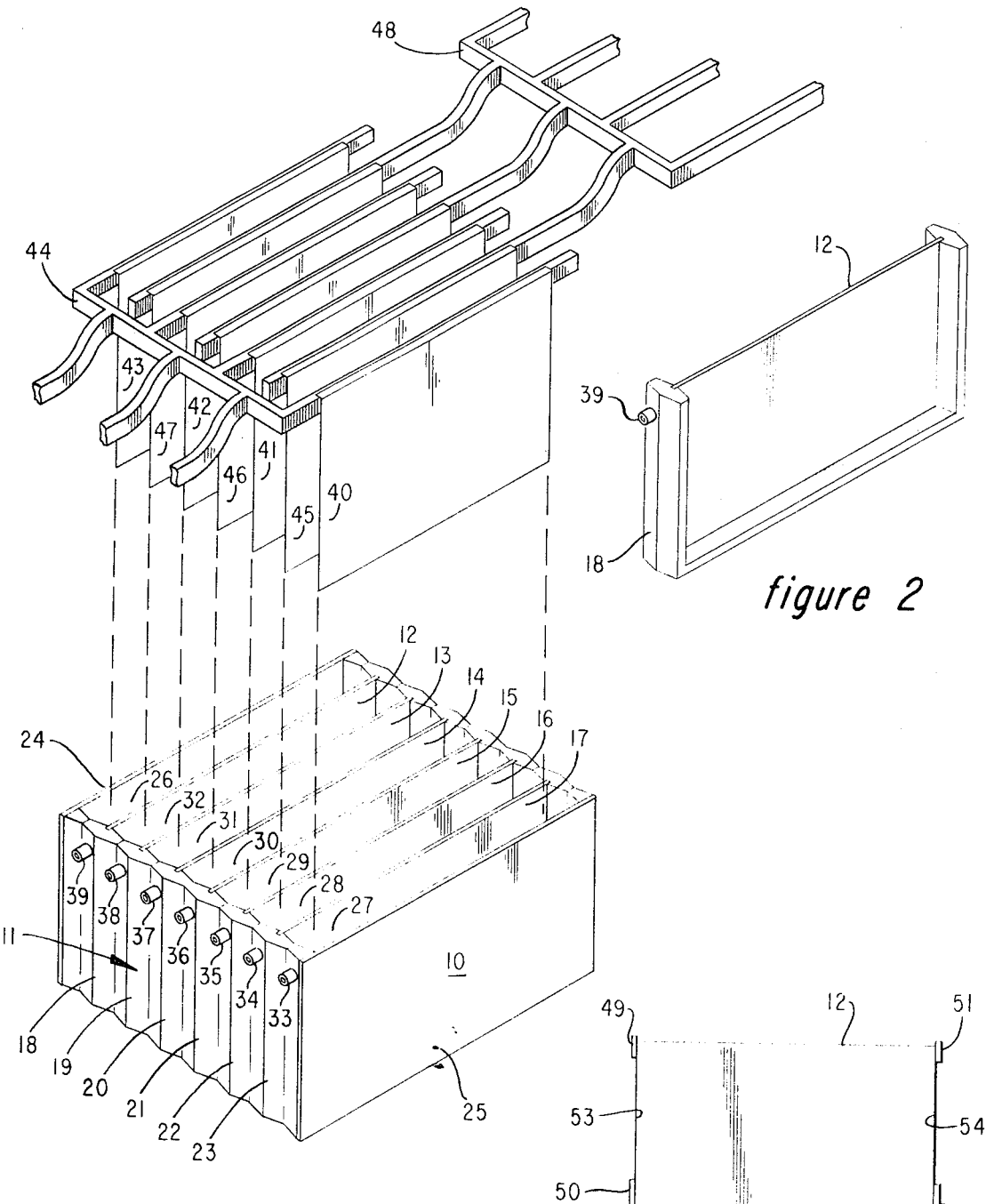

3,663,412
ELECTROLYTIC CELL
Edward E. Kling and James L. Cousino, Muskegon, Mich., and James A. Frens, Houma, La., assignors to Lakeway Chemicals, Inc., Muskegon, Mich.
Filed June 12, 1970, Ser. No. 45,790
Int. Cl. B01k 3/10
U.S. Cl. 204—257  9 Claims

ABSTRACT OF THE DISCLOSURE

An electrolytic cell comprises a cast U-shaped frame, a separator membrane mounted within said frame, and a pair endplates coextensive with the frame and together with a separator membrane defining elongated electrolyte compartments. An electrode is situated within each of the compartments, and a duct is provided within the frame communicating with the electrolyte compartment. Preferably, a portion of the separator membrane edge mounted within the frame is covered with a resilient material such as polytetrafluoroethylene. The cell is manufactured by casting the frame about a membrane, solidifying the cast frame, and thereafter welding the coextensive endplates on the frame.

BACKGROUND OF THE INVENTION

The invention relates to electrolytic cells. In one aspect this invention relates to electrolytic cells that are suitable for continuous regeneration of trivalent chromium salt solutions to form hexavalent chromium compounds.

Hexavalent chromium solutions, usually in the form of chromic acid admixed with sulfuric acid, are powerful oxidizing agents which are advantageously utilized in the oxidation of aromatic hydrocarbons; however the conditions within an electrolytic cell during its operation are quite severe owing to the corrosive nature of the acidic constituents that are present and also because of the relatively high temperatures that occur during regeneration. Therefore it is advantageous to have electrolytic cells that are corrosion resistant, have a relatively low initial cost, and which do not require extensive maintenance.

It is an object of the present invention to provide electrolytic cells having the aforesaid desirable characteristics. It is a further object to provide cells which can be cooled by immersion and which can be readily repaired if needed. Still other objects will present themselves to the skilled artisan upon reference to the ensuing specification, the drawings, and the claims.

SUMMARY OF THE INVENTION

The present invention contemplates an electrolytic cell which comprises an ion-permeable separator membrane fixedly mounted within a U-shaped frame. A pair of endplates coextensive with the frame are mounted on the frame at the periphery thereof on opposite sides of the separator membrane and spaced therefrom, thereby defining an elongated electrolyte compartment on each side of the membrane. Electrodes of opposite polarity are situated on opposite sides of the membrane, and a duct communicating with the electrolyte compartment is provided in the frame. In a preferred embodiment of this invention a portion of the mounting edge of the separator membrane is covered with a resilient material, such as polytetrafluoroethylene, which is adapted to absorb stresses generated due to the expansion and contraction of the frame upon variation in temperature. The cell of the present invention is advantageously manufactured by casting the frame, usually made of lead, about the separator membrane, solidifying the cast frame, and then welding the endplates in place. Alternatively, a series of cast U-shaped members can be cast and welded together so as to form a plurality of cell units and the endplates affixed at both ends of the total assembly.

BRIEF DESCRIPTION OF THE DRAWINGS

In the drawing,
FIG. 1 is a partially exploded perspective view showing the elements of a cell of the present invention;
FIG. 2 is a perspective view of a U-shaped member and a separator membrane mounted therein; and
FIG. 3 is an elevational view of a separator membrane utilized in a preferred embodiment of this invention and showing a resilient material cushioning portions of the mounting edges of the membrane.

DESCRIPTION OF THE PREFERRED EMBODIMENTS

Referring to FIG. 1, an electrolytic cell 10 comprises a U-shaped frame 11 and ion permeable separator membranes 12, 13, 14, 15, 16 and 17 mounted in frame 11 and within the respective U-shaped members 18, 19, 20, 21, 22 and 23 which, in turn, are welded together to form frame 11. Endplate 24 and 25 are coextensive with frame 11 and are affixed about the periphery thereof at both ends, usually by welding. Endplate 24 is spaced from membrane 12 and together with frame 11 define an elongated electrolyte compartment 26. Similarly endplate 25 and membrane 17 define electrolyte compartment 27 at the opposite end of frame 11. Additional electrolye compartments 28, 29, 30, 31 and 32 are defined between membranes 17 and 16, 16 and 15, 15 and 14, 14 and 13, and 13 and 12, respectively. Ducts 33, 34, 35, 36, 37, 38 and 39 are situated within frame 11 and communicate with electrolyte compartments 27, 28, 29, 30, 31, 32 and 26, respectively.

Within each electrolyte compartment is situated an electrode suitably connected to a direct current source. Depending on the polarity of the particular electrode, the electrolyte compartment can be either an anolyte or a catholyte compartment. Thus, in FIG. 1, electrodes 40, 41, 42 and 43, connected by means of current equalizer bar 44 to the positive terminal of a suitable direct current source, are anodes which are situated in anolyte compartments 27, 29, 31, and 26, respectively. Similarly cathodes 45, 46 and 47 are situated in catholyte compartments 28, 30 and 32 respectively, and are connected to the negative terminal of the aforesaid direct current source via current equalizer bar 48.

Referring to FIG. 2, U-shaped member 18 is typical of the unit structures that make up frame 11 of an electrolytic cell of this invention. Each cell can be made as large as desired, the size being determined chiefly by practical space and current availability limitations. Normally an electrolytic cell comprises about six such U-shaped members. Diaphragm 12 is centrally mounted within member 18 so as to provide symmetrical electrolyte compartments of equal volume when a plurality of such members is joined together. Duct 39 is mounted in member 18 and is offset to one side substantially as shown so that upon being joined with other frame members such as member 19, for example, each defined electrolyte compartment will have a duct communicating therewith.

While other non-crossive materials may be utilized, the preferred material of construction for electrolytic cells of this type is lead. The electrodes, current equalizer bars, U-shaped frame members, endplates, and the frame itself can be conveniently cast or molded therefrom. A further advantage from using lead is derived in that broken parts can be readily molten down and the material reused in the fabrication of new parts. Additionally, a broken or perforated membrane can be readily cut out from a cell unit and replaced by a new one without materially disturbing the remainder of the cell assembly.

Any separator membrane possessing the requisite ion-permeability for the intended purpose and which is inert relative to the particular electrolytes employed is suitable. Typical such membranes are rigid ceramic diaphragms of materials such as alumina, asbestos, fritted glass, titanium oxide composites, and the like.

A particularly preferred combination from the standpoint of durability and efficient cell operation is an alumina membrance encased or mounted in a lead frame. However, such separator membranes are quite brittle and have a rather limited coefficient of thermal expansion when heated, whereas lead expands substantially upon heating. These properties of the foregoing materials are advantageously utilized in the manufacture of the present cells by casting a U-shaped frame, or frame member, about a rigid alumina separator membrane. As molten lead solidifies about the separator membrane fixed in a desired position, the lead contracts on the membrane thus producing a liquid-tight seal.

In order to avoid the creation of excessive stresses upon cooling, particularly when the frame and the alumina membrane are relatively long, it is preferred to cover a portion of a mounting edge of the membrane with a resilient material which will be compressed as the lead contracts about the alumina and which will absorb some of the generated stresses.

As shown in FIG. 3, pieces 49, 50, 51 and 52 of a resilient material such as polytetrafluoroethylene are affixed to portions of edges 53 and 54 of membrane 12 prior to casting U-shaped member 18 thereabout, thereby cushioning the membrane within U-shaped member 18.

In operation of the electrolyte cell of this invention the electrolyte compartments are filled with a suitable electrolyte such as a trivalent chromium salt solution to be regenerated. Oxidation of the trivalent chromium ions takes place at the anode, thus the electrolyte in the anolyte compartment is periodically or continuously withdrawn, depending on the desired mode of operation. The cells of the present invention are particularly amenable to continuous operation whereby a series of cells are arranged in successively elevated positions so that electrolyte overflow through duct such as 33 in FIG. 1 for anolyte compartment 27 pours into a corresponding anolyte compartment of the next adjacent lower cell where additional trivalent chromium ions can be oxidized.

The foregoing discussion is intended as illustrative but not limiting. Still other variations and arrangements of parts within the spirit and scope of the present invention will readily present themselves to the skilled artisan.

We claim:
1. An electrolytic cell comprising
   a U-shaped frame;
   a separator membrane fixedly mounted within said frame along an edge of the membrane and a portion of a mounting edge of said membrane being cushioned by a resilient material;
   a pair of endplates coextensive with the frame, affixed at the periphery thereof on opposite sides of said membrane and in a spaced relationship therewith, each endplate together with the membrane defining an elongated electrolyte compartment therebetween;
   a duct in said frame communicating with the electrolyte compartment; and
   an electrode situated within each compartment and spaced from said membrane and said endplate, the electrodes situated on opposite sides of said membrane being of opposing polarity.

2. The cell in accordance with claim 1 wherein the resilient material is polytetrafluoroethylene.

3. The cell in accordance with claim 1 wherein the U-shaped frame and the endplates are lead.

4. The cell in accordance with claim 1 wherein said U-shaped frame comprises a plurality of aligned, integrally joined U-shaped members each having a separator membrane fixedly mounted therewithin along an edge of the membrane, said U-shaped members together with said membranes defining a plurality of electrolyte compartments therebetween.

5. The cell in accordance with claim 4 wherein an electrode is situated within each electrolyte compartment spaced from said membranes, the electrodes situated on opposing sides of each membrane being of opposing polarity.

6. The cell in accordance with claim 4 wherein a portion of the mounting edge of each of said membranes is enveloped by a resilient material.

7. The cell in accordance with claim 6 wherein the resilient material is polytetrafluoroethylene.

8. An electrolytic cell comprising
   a U-shaped frame;
   a separator membrane which is an alumina sheet fixedly mounted within said frame along an edge of the membrane;
   a pair of endplates coextensive with the frame, affixed at the periphery thereof on opposite sides of said membrane and in a spaced relationship therewith, each endplate together with the membrane defining an elongated electrolyte compartment therebetween;
   a duct in said frame communicating with the electrolyte compartment; and
   an electrode situated within each compartment and spaced from said membrane and said endplate, the electrodes situated on opposite sides of said membrane being of opposing polarity.

9. The cell in accordance with claim 8 wherein the U-shaped frame and the endplates are lead and wherein a mounting edge of said alumina sheet is cushioned by polytetrafluoroethylene.

References Cited
UNITED STATES PATENTS

| | | | |
|---|---|---|---|
| 614,633 | 11/1898 | Thum | 204—254 |
| 2,573,788 | 11/1951 | Furness | 204—257 |
| 1,937,621 | 12/1933 | Baum | 204—257 |

JOHN H. MACK, Primary Examiner

W. I. SOLOMON, Assistant Examiner

U.S. Cl. X.R.

204—258, 263, 282, 286